United States Patent [19]
Tabata et al.

[11] Patent Number: 6,149,546
[45] Date of Patent: *Nov. 21, 2000

[54] GEAR CHANGE CONTROL SYSTEM FOR AUTOMATIC TRANSMISSIONS

[75] Inventors: Atsushi Tabata, Okazaki; Hideo Tomomatsu, Nagoya; Shinji Kasuga, Anjo; Hiroji Taniguchi, Okazaki, all of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,065

[22] Filed: Sep. 22, 1997

[30] Foreign Application Priority Data

Sep. 25, 1996 [JP] Japan .................................. 8-274070
Mar. 25, 1997 [JP] Japan .................................. 9-090162

[51] Int. Cl.$^7$ .......................... F16H 61/16; F16H 59/00
[52] U.S. Cl. .............................. 477/125; 74/335
[58] Field of Search .................. 74/335, 336 R; 477/97, 902, 903, 904, 125, 120, 905; 701/52, 62, 64, 87

[56] References Cited

U.S. PATENT DOCUMENTS

| | | | |
|---|---|---|---|
| 4,922,769 | 5/1990 | Tury | 477/125 |
| 4,966,049 | 10/1990 | Takahashi | 477/903 X |
| 5,117,710 | 6/1992 | Asano et al. | 74/336 R |
| 5,127,288 | 7/1992 | Hojo et al. | 74/335 |
| 5,191,953 | 3/1993 | Ito et al. | 701/87 |
| 5,235,876 | 8/1993 | Minowa et al. | 477/904 X |
| 5,305,657 | 4/1994 | Bray et al. | 74/336 R |
| 5,390,117 | 2/1995 | Graf et al. | 701/62 X |
| 5,415,056 | 5/1995 | Tabata et al. | 74/335 |
| 5,425,686 | 6/1995 | Grange | 74/335 X |
| 5,489,247 | 2/1996 | Markyvech et al. | 477/904 X |
| 5,520,593 | 5/1996 | Yesel et al. | 74/336 R |
| 5,680,307 | 10/1997 | Issa et al. | 74/335 X |
| 5,738,607 | 4/1998 | Kondo et al. | 74/336 R |
| 5,823,052 | 10/1998 | Nobumoto | 74/335 |
| 5,839,083 | 11/1998 | Sugiyama | 701/62 |
| 5,873,802 | 2/1999 | Tabata et al. | 477/96 |
| 5,882,277 | 3/1999 | Iizuka | 477/125 |
| 5,893,294 | 4/1999 | Hosseini et al. | 74/335 X |

FOREIGN PATENT DOCUMENTS 5-196118   8/1993   Japan .

*Primary Examiner*—Sherry Estremsky
*Assistant Examiner*—Roger Pang
*Attorney, Agent, or Firm*—Oblon, Spivak, McClelland, Maier & Neustadt, P.C.

[57] ABSTRACT

A control system for an automatic transmission including a range switching mechanism for switching a shift range by electric means. It is detected that the switching of the shift range has been instructed by the range switching mechanism. It is decided that a gear change will occur according to the instructed switching of the shift range. It is decided that the decided gear change can be executed. The range switching of the shift range is inhibited, when it is not decided that the gear change is allowed.

6 Claims, 13 Drawing Sheets

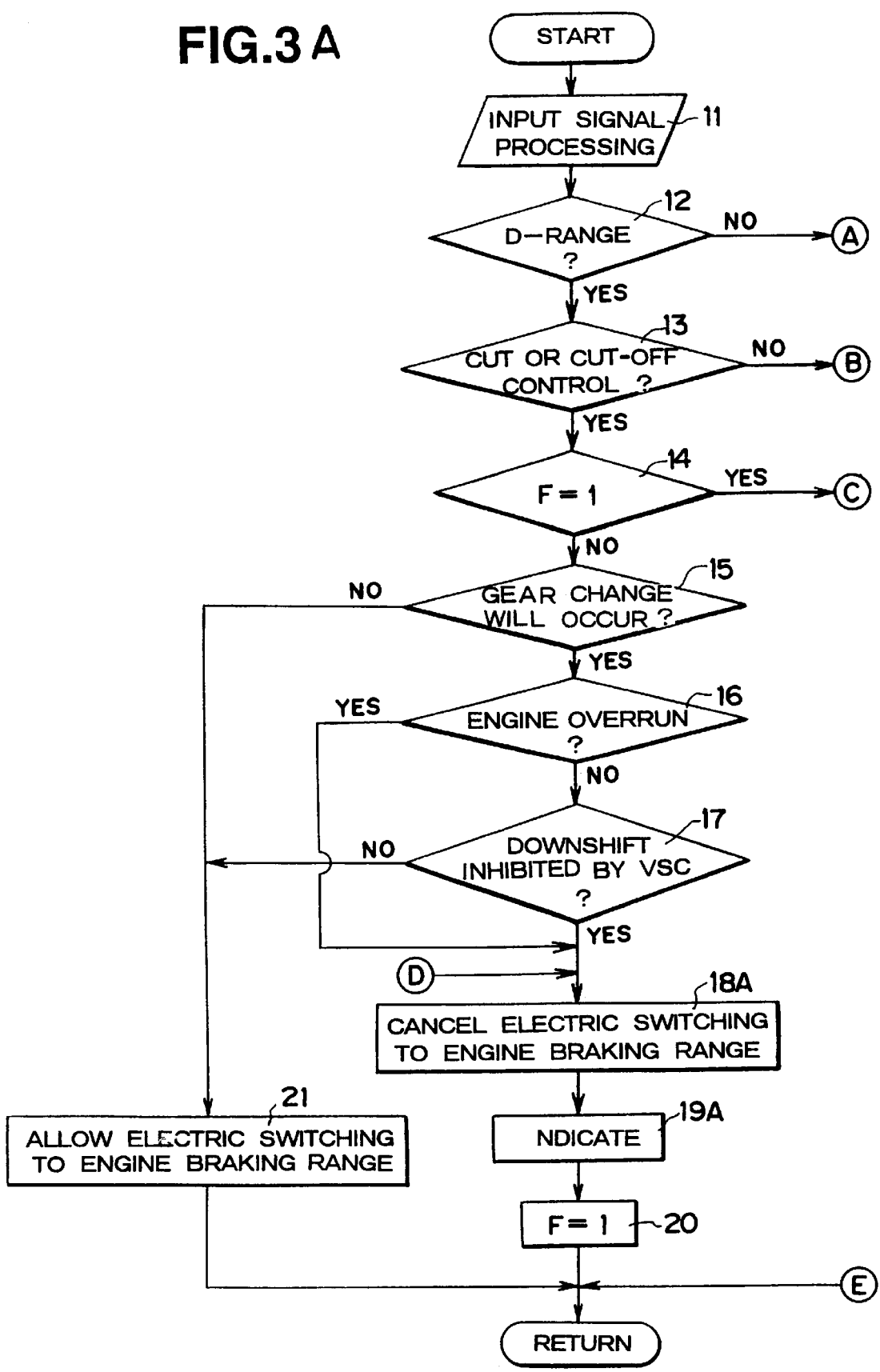

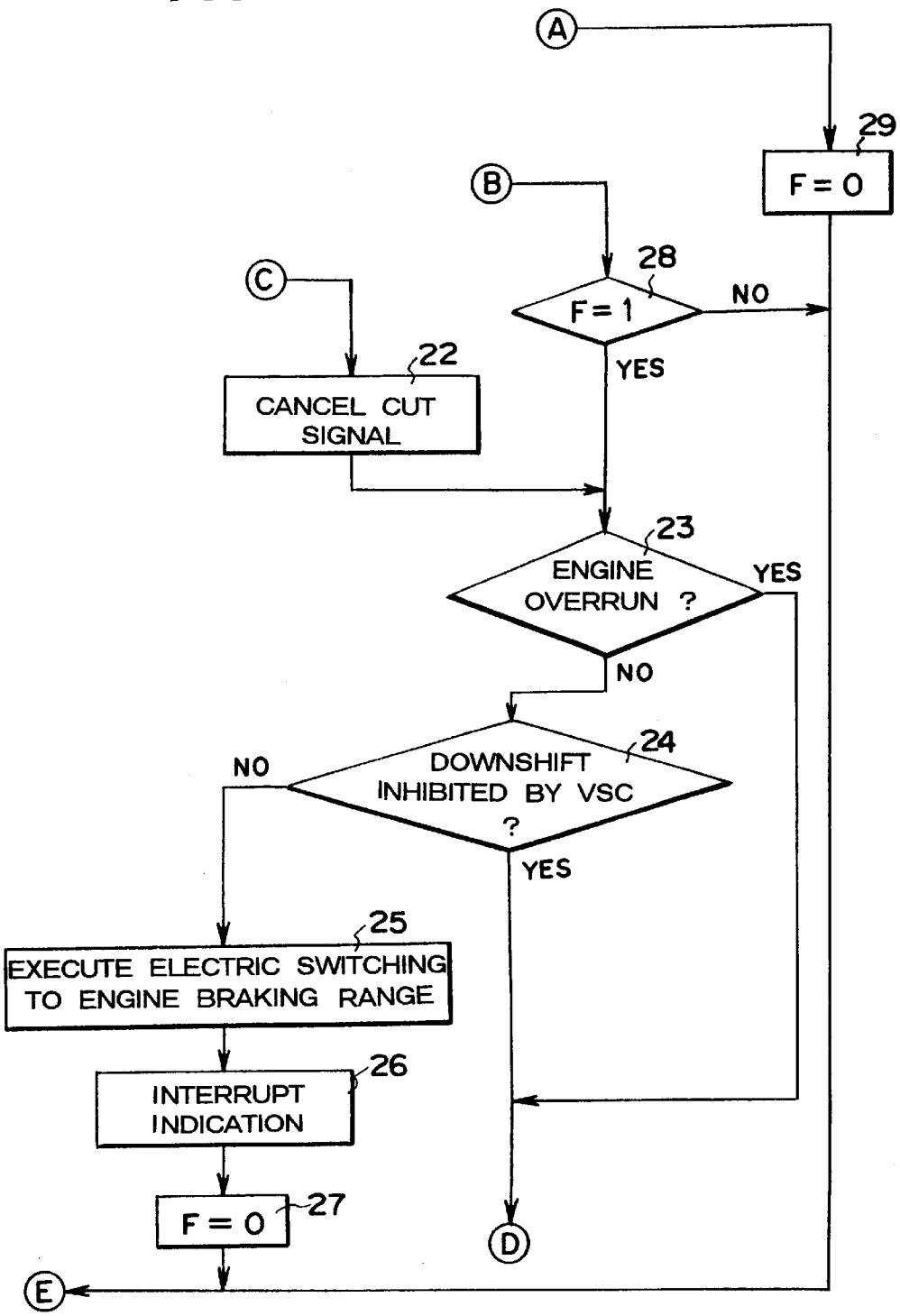

FIG.8

|   |     | C-0 | C-1 | C-2 | B-0 | B-1 | B-2 | B-3 | B-4 | F-0 | F-1 | F-2 |
|---|-----|-----|-----|-----|-----|-----|-----|-----|-----|-----|-----|-----|
|   | P   |     |     |     |     |     |     |     |     |     |     |     |
|   | Rev |     |     | ○   | ○   |     |     |     | ○   |     |     |     |
|   | N   | ○   |     |     |     |     |     |     |     |     |     |     |
| D | 1st | ○   | ○   |     |     |     |     |     |     | ○   |     | ○   |
|   | 2nd |     | ○   |     |     |     |     | ○   |     | ○   |     |     |
|   | 3rd | ○   | ○   |     |     |     | ○   |     |     | ○   | ○   |     |
|   | 4th | ○   | ○   | ○   |     |     | ◎   |     |     | ○   |     |     |
|   | 5th |     | ○   | ○   | ○   |     | ◎   |     |     |     |     |     |
| 4 | 1st | ○   | ○   |     |     |     |     |     |     | ○   |     | ○   |
|   | 2nd |     | ○   |     |     |     |     | ○   |     | ○   |     |     |
|   | 3rd | ○   | ○   |     |     |     | ○   |     |     | ○   | ○   |     |
|   | 4th | ○   | ○   | ○   |     |     | ◎   |     |     | ○   |     |     |
| 3 | 1st | ○   | ○   |     |     |     |     |     |     | ○   |     | ○   |
|   | 2nd |     | ○   |     |     |     |     | ○   |     | ○   |     |     |
|   | 3rd | ○   | ○   |     |     | ●   | ○   |     |     | ○   | ○   |     |
| 2 | 1st | ○   | ○   |     |     |     |     |     |     | ○   |     | ○   |
|   | 2nd | ●   | ○   |     |     |     |     |     | ○   | ○   |     |     |
| L | 1st | ○   | ○   |     |     |     |     |     | ●   | ○   |     | ○   |

GEAR CHANGE CONTROL SYSTEM FOR AUTOMATIC TRANSMISSIONS

BACKGROUND OF THE INVENTION

1. Field of the Invention

The present invention relates to a control system for controlling the setting of a shift range in an automatic transmission for a vehicle.

2. Related Art

The automatic transmission for a vehicle is given a fundamental function to set a gear stage automatically on the basis of a running condition such as a vehicle speed or a throttle opening. However, the selection of the shift range, in which the engine braking is effected at a predetermined medium or lower gear stage or in which the gear stage to be set is limited to a predetermined medium or lower one, is manually made by the driver. In the prior art, the selection of that shift range is made by operating a shift lever which is located on the floor or steering column. For this operation, the driver has to leave one hand from the steering wheel or has to turn the eyes temporarily from the front road. This raises operational problems to be improved.

In the invention disclosed in Japanese Patent Laid-Open No. 196118/1993 (or JP-A-5-196118), therefore, the steering handle is equipped with a switch, which is suitably turned ON/OFF to switch the shift range.

The shift range, as can be selected during a forward run, is one for limiting the highest gear stage to be set and for effecting the engine braking at a medium or low gear stage. According to the invention disclosed in the aforementioned Laid-Open, each time the switch is turned ON for an up-range or down-range, an instruction signal is outputted to switch the shift range to one higher or lower by one. Let it be assumed that a downshift occurs when the shift range is switched to a lower one, for example. Then, a frictional engagement element for the engine braking is applied to raise the engine RPM so that an overrun or over-revolution of the engine is caused if the vehicle runs at a high speed. Thus, this switching of the shift range is inhibited from the standpoint of protecting the engine.

Specifically, the switching of the shift range in the automatic transmission is not always made each time an electric instruction is made on the basis of the switching operation. On the basis of the running state of the vehicle, the instruction of the switching of the shift range may be rejected to leave the shift range switching unexecuted. In this case, the switch for switching the shift range in the control system is constructed to output its signal each time it is turned ON. If this instruction signal is rejected, the operation for switching the shift range has to be executed again to increase the number of operations for switching the shift range. Despite of the advantage that the shift range switching can be executed by operating switch, this operation may become troublesome if the instruction of the gear change is rejected according to the state of the vehicle.

SUMMARY OF THE INVENTION

A main object of the present invention is to provide a control system capable of making the number of repeating the switching operations of a shift range as small as possible thereby to improve the operability.

Another object of the present invention is to provide a control system capable of informing the driver of the set state of the shift range which can be switched by an electric operation.

The control system of the present invention is applied to an automatic transmission which is equipped with a range switching mechanism capable of switching a shift range by electric means. When an instruction of switching the shift range is made by operating the range switching mechanism, it is decided whether or not a gear change will occur according to the switching of the shift range. When it is decided that the situation does not allow the gear change, the switching of the shift range is inhibited.

According to the control system of the present invention, therefore, the switching of the shift range is allowed when the gear change accompanying the switching of the instructed shift range can be executed or when no gear change will occur according to the switching of the shift range. As a result, the instruction of the electric switching of the shift range is less rejected to reduce the number of operations for switching the shift range thereby to improve the operability.

In the control system of the present invention, on the other hand, when the switching of the shift range is inhibited, its instruction is held. When this inhibited state of the switching of the shift range is released, the switching of the held shift range is executed. This makes it unnecessary to instruct the same content as that of the switching of the inhibited shift range, so that the switching operation of the shift range is less repeated to improve the operability.

Moreover, the control system of the present invention is equipped with means for displaying that the switching of the shift range is held, so that the driver can be reliably informed of the held state. As a result, the repetition of the switching operations of the shift range is prevented to improve the operability.

Moreover, the control system of the present invention can be constructed to cancel the switching instruction of the shift range in place of its holding. With this construction, when the gear change accompanying the switching of the shift range is inhibited, the switching instruction of the shift range is canceled to restore the state in which no instruction to switch the shift range is made. As a result, no gear change occurs even when the inhibited gear change is allowed as the running state changes. In other words, the gear change can be prevented from occurring at the instant when a considerable time period was elapsed after the switching instruction of the shift range, thereby to prevent the physical disorder which might otherwise be caused by the delay in the gear change.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 3A shows a portion of a flow chart for explaining a control embodiment in which the instruction of a shift range is canceled according to an inhibition of the switching of the shift range;

FIG. 3B shows another portion of the flow chart;

FIG. 8 is a chart tabulating the applied/released states of frictional engagement elements for setting individual gear stages;

DETAILED DESCRIPTION OF THE PREFERRED EMBODIMENTS

Figure 6:
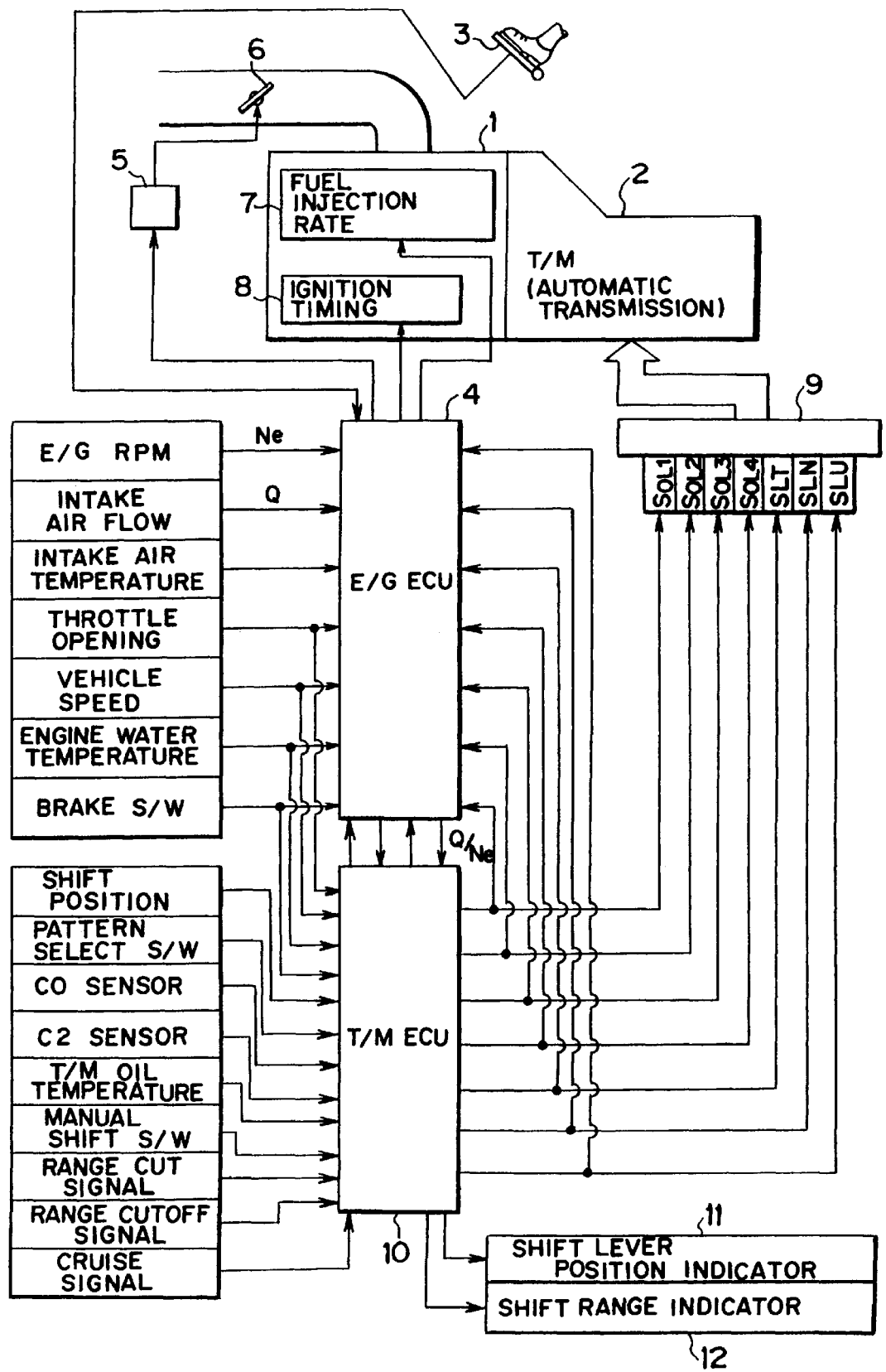
FIG. 6 is a diagram schematically showing an overall control system of an automatic transmission to which is applied the present invention.

The present invention will be described in more detail with reference to the accompanying drawings. Here will be described an overall control system. FIG. 6 shows the control system of an engine (E/G) 1 as an example of the prime mover and an automatic transmission 2. A signal according to the depression of an accelerator pedal 3 is inputted to an E/G ECU (i.e., an electronic control unit for the engine) 4. The intake pipe of the engine 1 is equipped with an electronic throttle valve 6 to be driven by a throttle actuator 5. The electronic throttle valve 6 is controlled in its degree of opening by a control signal which is outputted according to the depression of the accelerator pedal 3 from the E/G ECU 4 to the throttle actuator 5.

The E/G ECU 4 for controlling the engine 1 is mainly constructed of a central processing unit (CPU), memories (RAM and ROM) and an input/output interface. In addition to the aforementioned signal according to the depression of the accelerator pedal 3, control data including an engine RPM Ne, an intake-air flow Q, an intake air temperature, a throttle opening, a vehicle speed, an engine water temperature and a brake switch output signal are inputted to that E/G ECU 4. On the other hand, this E/G ECU 4 is constructed to control the throttle actuator 5 and to output signals to a fuel injector 7 for the torque control at a shifting time and an igniter 8 for changing the ignition timing.

The automatic transmission 2, as connected to the engine 1, is the so-called "electronic control automatic transmission" for controlling the oil pressure electrically to control the shifts and the application/release of a lock-up clutch. The oil pressure is controlled by a hydraulic control unit 9. This hydraulic control unit 9 is equipped with: three shift solenoid valves SOL1, SOL2 and SOL3 for executing the shifts mainly; a solenoid valve SOL4 for controlling the engine braking state mainly; a linear solenoid valve SLU for controlling the lock-up clutch mainly; a linear solenoid valve SLT for controlling a line pressure in accordance with the throttle opening; and a linear solenoid valve SLN for controlling the back pressure of an accumulator mainly.

There is further provided a T/M ECU (i.e., an electronic control unit for the automatic transmission) 10 for outputting control signals to the individual solenoid valves of that hydraulic control unit 9. This T/M ECU 10 is mainly constructed, like the aforementioned E/G ECU 4, of a central processing unit (CPU), memories (RAM and ROM) and an input/output interface so that it can be united/integrated, if necessary, with the E/G ECU 4. The T/M ECU 10 is constructed to execute arithmetic operations, as based upon input data, in accordance with maps and arithmetic expressions stored in advance, and to output control signals, as based upon the arithmetic results, to the aforementioned individual solenoid valves to control the application/release of the lock-up clutch and the transient oil pressure at the shifting time.

To the T/M ECU 10, moreover, there are inputted control data including not only the aforementioned throttle opening, vehicle speed, engine water temperature and brake switch output signal but also a shift position indicating the position of a shift lever acting as a first range switching mechanism, a pattern select switch output signal, an output signal of a C0 sensor for detecting the RPM of a clutch C0, an output signal of a C2 sensor for detecting the RPM of a second clutch C2, the oil temperature of the automatic transmission 2, an output signal of a manual shift switch, a cut signal for switching a shift range to a lower-speed one, a cut-off signal for switching a shift range to a higher-speed one, and a cruise signal to be outputted from a (not-shown) cruise controller for keeping the vehicle speed at a constant value. With the T/M ECU 10, moreover, there are connected a shift lever position indicator 11 for indicating the position of the shift lever, and a shift range indicator 12 for indicating the shift range selected.

These electronic control units 4 and 10 are connected to transmit the data to each other such that the signals for setting the individual gear stages are transmitted from the T/M ECU 10 to the E/G ECU 4 whereas the intake air flow (Q/Ne) per revolution of the engine 1 is transmitted from the E/G ECU 4 to the T/M ECU 10.

Figure 7:
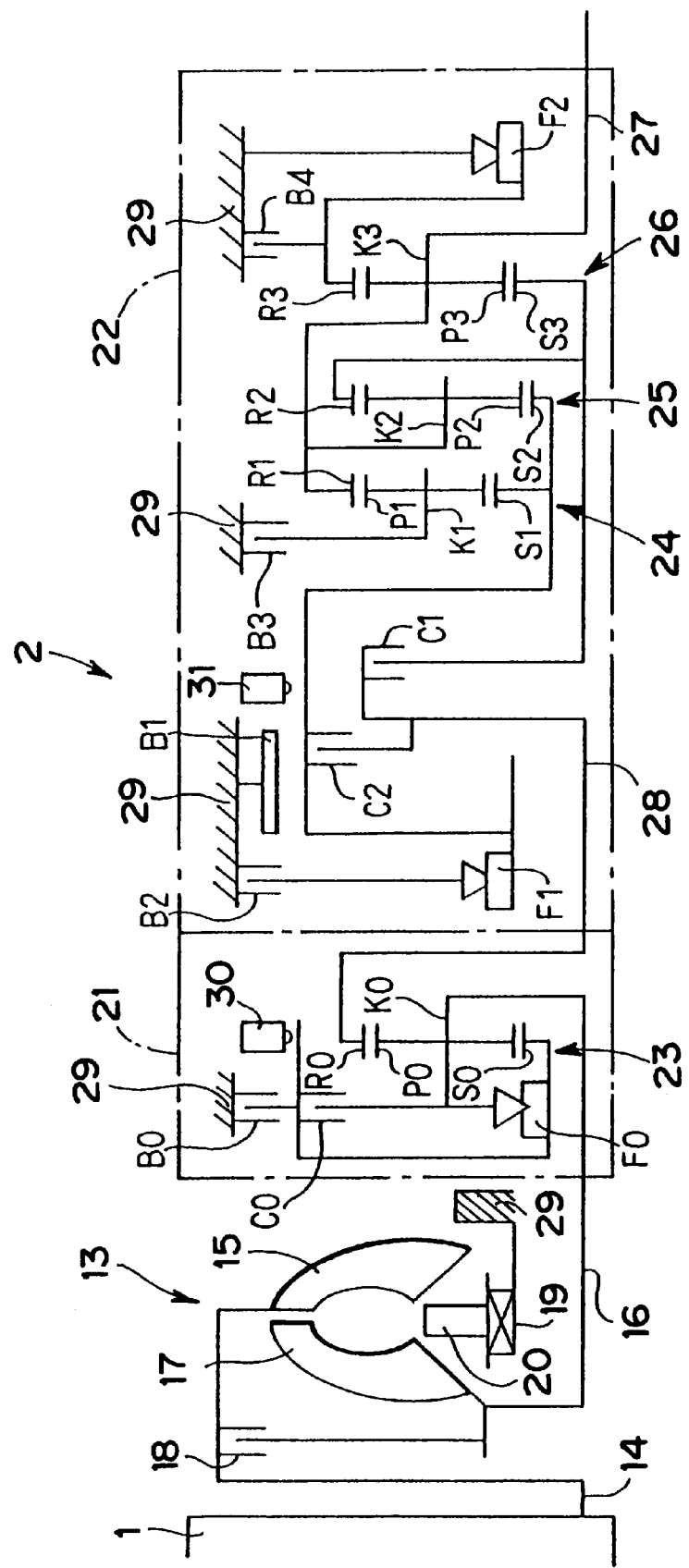
FIG. 7 is a skeleton diagram showing one example of the gear train of the automatic transmission to which is applied the present invention.

The automatic transmission 2 can set five forward and one reverse gear stages, and its gear train is exemplified in FIG. 7. As shown in FIG. 7, the automatic transmission 2 is connected to the engine 1 through a torque converter 13. This torque converter 13 is equipped with: a pump impeller 15 connected to a crankshaft 14 of the engine 1; a turbine runner 17 connected to an input shaft 16 of the automatic transmission 2; a lock-up clutch 18 connecting the pump impeller 5 and the turbine runner 17 directly; and a stator 20 prevented from rotating in one direction by a one-way clutch 19.

The automatic transmission 2 is further equipped with: an auxiliary transmission unit 21 for shifting two high and low stages; and a main transmission unit 22 for shifting the reverse and four forward stages. The auxiliary transmission unit 21 is equipped with: a planetary gear set 23 composed of a sun gear S0, a ring gear R0, and a pinion P0 rotatably supported by a carrier K0 and meshing with those sun gear S0 and ring gear R0; the clutch C0 and a one-way clutch F0 interposed between the sun gear S0 and the carrier K0; and a brake B0 interposed between the sun gear S0 and a housing 29.

The main transmission unit 22 is equipped with: a first planetary gear set 24 composed of a sun gear S1, a ring gear R1 and a pinion P1 rotatably supported by a carrier K1 and meshing with those sun gear S1 and ring gear R1; a second planetary gear set 25 composed of a sun gear S2, a ring gear R2 and a pinion P2 rotatably supported by a carrier K2 and meshing with those sun gear S2 and ring gear R2; and a third planetary gear set 26 composed of a sun gear S3, a ring gear R3 and a pinion P3 rotatably supported by a carrier K3 and meshing with those sun gear S3 and ring gear R3.

The sun gear S1 and the sun gear S2 are integrally connected to each other, and the ring gear R1 and the carriers K2 and K3 are integrally connected to each other. The carrier K3 is connected to an output shaft 27. The ring gear R2 is integrally connected to the sun gear S3. Moreover, a first clutch C1 is interposed between those ring gear R2 and sun gear S3 and an intermediate shaft 28, and the second clutch C2 is interposed between those sun gears S1 and S2 and the intermediate shaft 28.

The housing 29 is equipped with a first brake B1 of band type acting as brake means for braking the rotations of the sun gears S1 and S2. Between these sun gears S1 and S2 and the housing 29, there are interposed a first one-way clutch F1 and a brake B2 in series. The first one-way clutch F1 is applied when the sun gears S1 and S2 are to rotate backward of the input shaft 6.

A third brake B3 is interposed between the carrier K1 and the housing 29, and a fourth brake B4 and a second one-way clutch F2 are interposed in parallel between the ring gear R3 and the housing 29. The second one-way clutch F2 is applied when the ring gear R3 is to rotate backward. The clutches C0, C1 and C2 and brakes B0, B1, B2, B3 and B4 described above are hydraulic frictional engagement elements, the frictional members of which are engaged when the oil pressure is applied thereto.

A C0 sensor 30 is provided for detecting the RPM of the clutch C0 in the auxiliary transmission unit 21, i.e., the input RPM, and a C2 sensor 31 is provided for detecting the RPM of the second clutch C2 in the main transmission unit 22. These sensors 30 and 31 are connected with the T/M ECU 10, as described hereinbefore.

The automatic transmission 2 thus far described is enabled to set the five forward and one reverse gear stages by its individual frictional engagement elements to be applied/released, as tabulated in an application chart of FIG. 8. In FIG. 8: symbols ○ indicate the applied state; symbols ◎ indicate the applied state having no relation to the torque transmission; symbols ● indicate the applied state for effecting the engine braking; and blanks indicate the released state.

Figure 9:
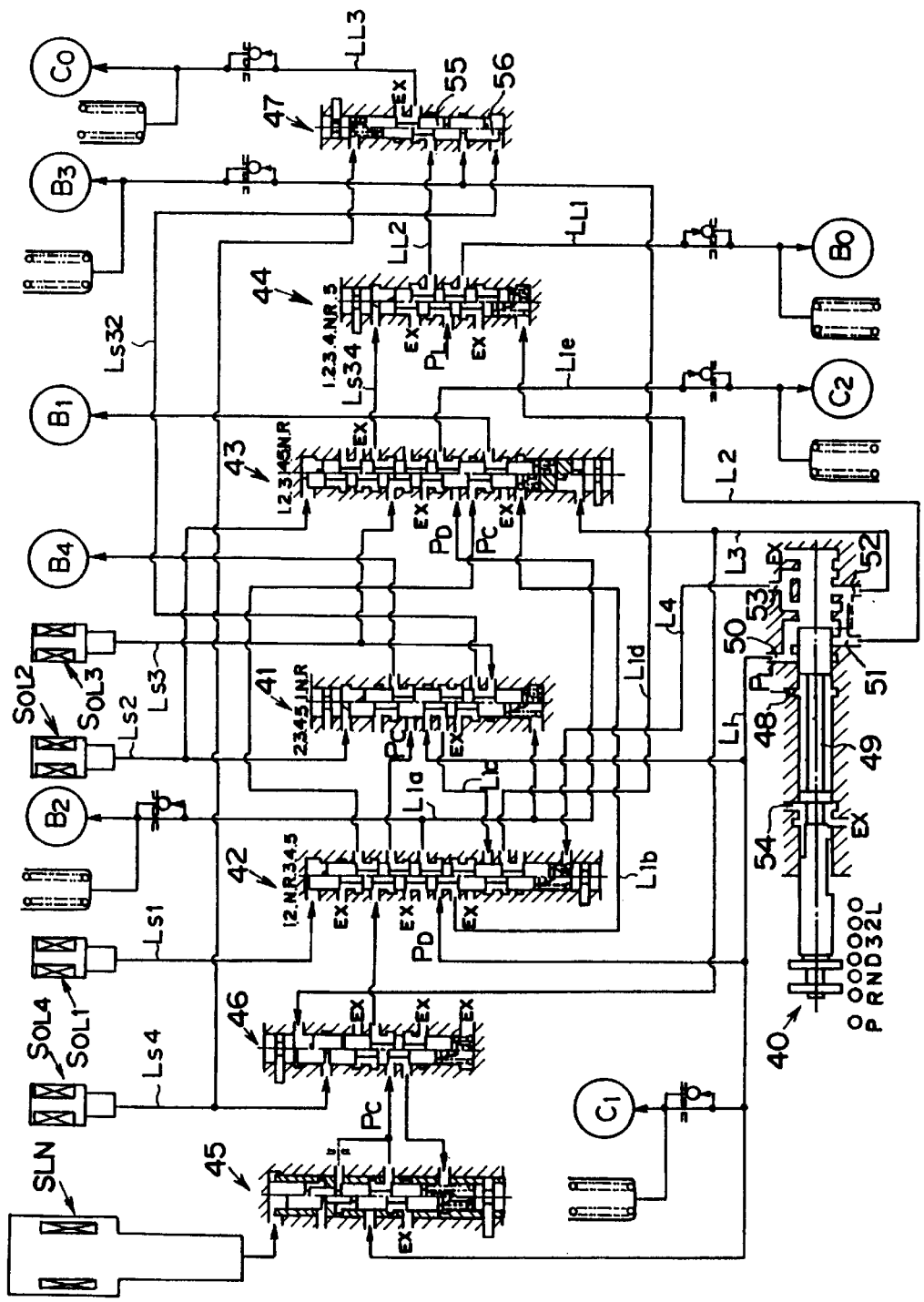
FIG. 9 is a partial hydraulic circuit showing a portion of the hydraulic circuit of the automatic transmission to which is applied the present invention.

The hydraulic control unit 9 is equipped with a hydraulic circuit, as shown in FIG. 9, for setting the individual shift ranges and gear stages shown in FIG. 8. Between a manual valve 40 for receiving the feed of a line pressure PL according to the throttle opening and the hydraulic servo means of the aforementioned individual frictional engagement elements, there are interposed: a 1–2 shift valve 41 for controlling the feed/release of a control pressure PC to/from the fourth brake B4 for the engine braking at the 1st speed; a 2–3 shift valve 42 for controlling the feed/release of a drive range pressure PD to/from the second brake B2 for establishing the 3rd speed; a 3–4 shift valve 43 for controlling the feed/release of the control pressure PC to/from the first brake B1 for the engine braking at the 3rd speed and for controlling the feed/release of the drive range pressure PD to/from the second clutch C2 for establishing the 4th and 5th speeds; and a 4–5 shift valve 44 for switching the feed of the line pressure PL to the brake B0 and the clutch C0.

Further interposed are: a pressure control valve 45 for changing the regulated pressure level during a shift in accordance with the signal pressure of the linear solenoid valve SLN by the initial pressure of the drive range pressure (i.e., D-range pressure) thereby to generate the control pressure PC according to the regulated pressure level; an engine braking relay valve 46 for switching the feed/release of the control pressure PC to/from the 2–3 shift valve 42; and a C0 exhaust valve 47 for switching the feed/release of the line pressure PL to/from the clutch C0 through the 4–5 shift valve 44.

Here: the first shift solenoid valve SOL outputs a signal pressure for switching the 2–3 shift valve 42; the second shift solenoid valve SOL2 outputs a signal pressure for switching the 1–2 shift valve 41; and the third shift solenoid valve SOL3 outputs a signal pressure for switching the C0 exhaust valve 47 through the 1–2 shift valve 41. On the other hand, the fourth solenoid valve SOL4 outputs a signal pressure for switching the engine brake relay valve 46 and the C0 exhaust valve 47, and the linear solenoid valve SLN outputs a signal pressure for regulating the pressure to the pressure control valve 45. Moreover, the frictional engagement elements other than the first brake B1 and the fourth brake B4 are equipped with accumulators.

Here will be described in more detail the constructions and functions of the aforementioned individual units. The manual valve 40 is constructed of a spool valve which is connected by mechanical means such as a cable to the not-shown shift lever acting as a first range switching mechanism. The manual valve 40 is fed at its input port 48 with the line pressure PL so that the input port 48 is opened, as a spool 49 is moved, to communicate with one or more output ports in accordance with the position of the spool 49 thereby to output the line pressure PL to the communicating output port or ports. In the D-position, specifically, the line pressure PL is outputted only from a D-range port 50. In the "3"-position, the line pressure PL is outputted additionally from a "3"-range port 51. In the "2[|P]'-position, the line pressure PL is outputted additionally from a "2"-range port 52. In the L-position, the line pressure PL is outputted additionally from an L-range port 53. In the R-position, on the other hand, the line pressure PL is outputted from an R-range port 54. In the N-position, all the output ports are closed. In the P-position, the input port 48 is opened to communicate with a drain port EX. Here, the aforementioned automatic transmission 2 can select the "4"-range, which is a shift range for inhibiting the highest gear stage or the 5th speed. In this "4"-range, the spool 49 rotates on its center axis in the manual valve 40 so that the oil pressure is outputted from the aforementioned "2"-range port 52.

The pressure control valve 45 is equipped with a spool and a plunger which are urged in one direction by a spring. This control valve 45 regulates the D-range pressure PD, as inputted thereto, according to the output signal of the linear solenoid valve SLN and feeds the control pressure PC to the 2–3 shift valve 42 through the engine brake relay valve 46.

The engine braking relay valve 46 is a change-over valve which is equipped with a spool and a plunger, as urged in one direction by a spring. This relay valve 46 is fed at its plunger with the "2"-range pressure and at its spool with the signal pressure of the linear solenoid valve SLN, and switches the feed of the control pressure PC to the 2–3 shift valve 42 by either of the pressures and the release of the control pressure PC from the 2–3 shift valve 42 by the relief of that pressure.

The 2–3 shift valve 42 is a change-over valve equipped with a spool urged in one direction by a spring. This shift valve 42 is fed with the signal pressure of the first shift solenoid valve SOL1 and the L-range pressure, and switches the feeds of the control pressure PC to the 3–4 shift valve 43 and the 1–2 shift valve 41, and the communications of the D-range pressure with oil passages L1*a* and L1*b* and the drainage of the same. The 1–2 shift valve 41 is a change-over valve equipped with a spool urged in one direction by a spring. This shift valve 41 is fed with the signal pressure of the second shift solenoid valve SOL2 and the oil pressure from the oil passage L1*a*, and switches the feed of the control pressure PC to the fourth brake B4 and the discharge of the same from the brake B4, and the feed of the signal pressure of the third shift solenoid valve SOL3 to an oil passage LS32 and the discharge of the same from the oil passage LS32.

The 3–4 shift valve 43 is a change-over valve equipped with a spool urged in one direction by a spring through a piston. This shift valve 43 is fed with the signal pressure of the second shift solenoid valve SOL2, the oil pressure from the oil passage L1*b* and an oil pressure from an oil passage L3, and switches the feed and block of the signal pressure of the third shift solenoid valve SOL3 from an oil passage LS3 to and from the 4–5 shift valve 44 via an oil passage LS34, the connection and disconnection between the oil passage L1*a* and an oil passage L1*e*, and the feed and discharge of the control pressure PC to and from the first brake B1.

The 4–5 shift valve 44 is a change-over valve which is equipped with a spool urged in one direction by a spring. This shift valve 44 is fed with the signal pressure of the oil passage LS34 and an oil pressure of an oil passage L2, and switches the feed and discharge of the line pressure PL to and from the C0 exhaust valve 47, and the feed and discharge to and from the brake B0 via an oil passage LL1.

The C0 exhaust valve 47 is a change-over valve which is equipped with a spool 55 and a plunger 56, as urged in one direction by a spring. This exhaust valve 47 is fed with the signal pressure of the fourth solenoid valve SOL4 via the oil passage LS4, the signal pressure of the third solenoid valve SOL3 via the oil passage LS32 and an oil pressure of an oil passage L1*d*, and switches the feed and discharge of the like pressure PL, as fed through the 4–5 shift valve 44, to and from the clutch C0 via an oil passage LL3.

In the shown neutral position of the hydraulic control unit thus constructed, the line pressure PL is fed to the clutch C0 through the 4–5 shift valve 44 and the C0 exhaust valve 47, but the oil passage through the manual valve 40 is closed, so that the oil pressure of the first clutch C1 is drained. In FIG. 9, the displacements of the individual valves across the center lines illustrate the limit positions of the spools to move. Especially for the individual shift valves, the numerals, as divided at the right and left sides of the center lines, indicate the correspondences between the spool positions and the gear stages.

According to the hydraulic control unit, the individual gear stages are set such that the range pressures are regulated whereas the individual shift solenoid valves SOL1 to SOL3 are turned ON/OFF by the electronic controls corresponding to the vehicle speed and the engine load (e.g., the throttle opening) in accordance with the selection of the position of the manual valve, as made by manipulating a shift device. In other words, the individual clutches and brakes are controlled, as illustrated in FIG. 8, so that the individual gear stages can be set in relation to the one-way clutches (OWC), and the engine (E/G) braking state can be established by the output of the signal pressure, as caused by turning ON/OFF the fourth solenoid valve SOL4. When the signal pressure is outputted from the fourth solenoid valve SOL4 while the 3rd speed is set in the D-range, for example, the spool of the engine braking relay valve 46 is moved to the position, as indicated by the lefthand half of FIG. 9. As a result, the control pressure PC, as originating from the D-range pressure, is fed through the 2–3 shift valve 42 to the 3–4 shift valve 43 thereby to apply the first brake B1. In short, the engine braking is effective at the 3rd speed.

When the signal pressure is outputted from the fourth solenoid valve SOL4 while the 2nd speed is set in the D-range, the oil pressure is fed to one end side of the spool of the C0 exhaust valve 47 so that the spool is moved to the position, as indicated by the lefthand half of FIG. 9. As a result, the line pressure PL, as fed through the 4–5 shift valve 44, is fed to apply the clutch C0 in the auxiliary transmission unit 21 so that the engine braking can be effected at the 2nd speed.

When the signal is outputted from the fourth solenoid valve SOL4 at the 1st speed in the D-range, the control pressure PC is outputted, as in the aforementioned case of the 3rd speed, from the engine braking relay valve 46 to the 2–3 shift valve 42 and is fed from the 2–3 shift valve 42 to the 1–2 shift valve 41 to apply the fourth brake B4. In short, the engine braking can be effected at the 1st speed.

Here, the individual gear stages for the 1st to 5th speeds are set, as in the system of the prior art, by turning ON/OFF the first to third shift solenoid valves SOL1 to SOL3 to switch the individual shift valves 41 to 44 suitably by the output pressures of the solenoid valves, as could be easily understood from the hydraulic circuit of FIG. 9.

Thus in the automatic transmission 2, the individual gear stages can be set by the electric controls, and the engine braking effects at the 3rd or lower gear stages can be set by controlling the fourth solenoid valve SOL4 electrically. By making use of these functions, the control system according to the present invention is enabled to switch the forward ranges electrically.

Figure 10A:
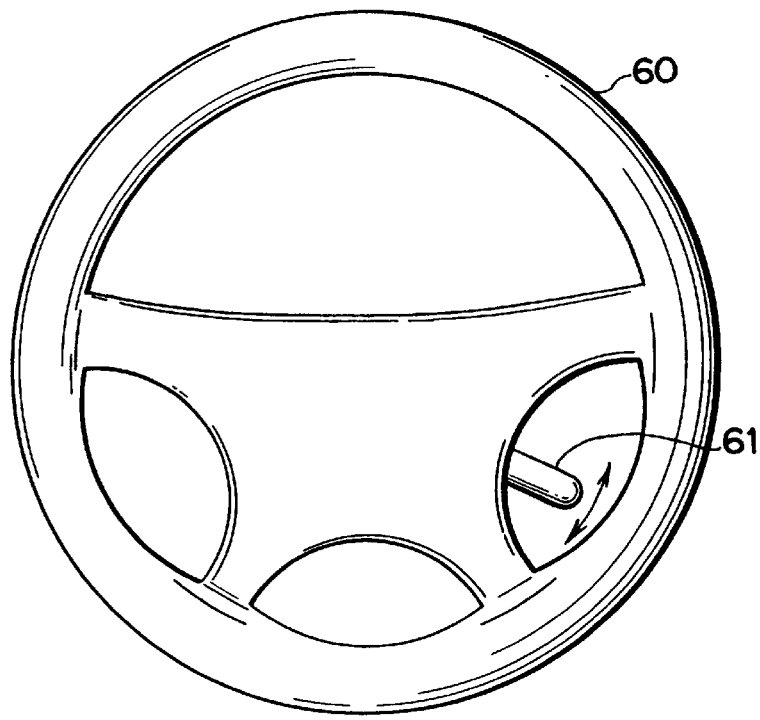
FIG. 10A is a view taken from the front side of a steering wheel and showing a second lever or a second range switching mechanism according to the present invention.
Figure 10B:
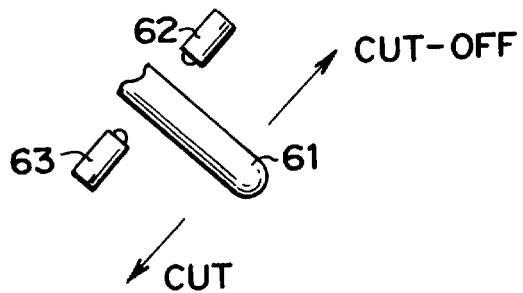
FIG. 10B is a partially enlarged view of the second shift lever.
Figure 10C:
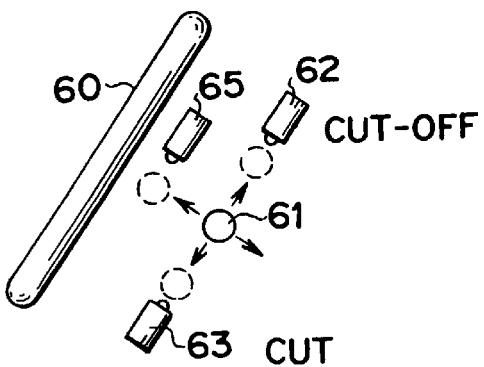
FIG. 10C is a view, as taken from the side of the steering wheel, of the second shift lever.

A range switching mechanism, i.e., a second range switching mechanism for switching the forward ranges electrically is exemplified in FIGS. 10A, 10B and 10C. Reference numeral 60 appearing in these Figures designates a steering wheel (or handle), and a second shift lever 61 is attached to the (not-shown) steering column having the steering wheel 60 mounted thereon. The second shift lever 61 is so arranged near the steering wheel 60 as to protrude radially from the steering column and is given such a length that it can be manipulated by a finger of the hand gripping the steering wheel 60. Moreover, the second shift lever 61 is so elastically held and normally positioned in a neutral position that it can be turned around the steering column and pulled toward the steering wheel 60.

The turning motion of the second shift lever 61 in the circumferential direction is to increment/decrement the shift ranges and is equipped with switches 62 and 63 for detecting the turning motion. These switches 62 and 63 are the so-called "momentary switches" for outputting signals each time they are turned ON. Of these, the switch 62, as located in a position turned counter-clockwise of FIG. 10A from the neutral position of the second shift lever 61, is a cut-off switch for outputting a signal to switch (or up-range) the shift range to a higher-speed one. The switch 63, as located at the opposite side, is a cut switch for outputting a signal to switch (or down-range) the shift range to a lower-speed one.

These cut-off switch 62 and cut switch 63 are connected with the aforementioned automatic transmission electronic control unit (T/M ECU) 10. These switches 62 and 63 are so constructed that they are active, when the D-range is set by the shift lever of the not- shown shift device, to output their electric signals. This can be achieved by activating the circuits of the switches 62 and 63 when the D-range is selected by the (not-shown) shift lever for switching the aforementioned manual valve 40 mechanically.

Furthermore, in the present invention, an active switch which enables the cut-off switch 62 and cut switch 63 to be active can be used. In this case, a M (manual)-position is arranged at the side of the D-range position in the shift device, and the active switch is located at the M-position. In this structure, the active switch is turned ON by the shift lever when the M-position is selected by the driver.

Moreover, the second shift lever 61 is pulled toward the steering wheel 60 so that the shift range, as electrically set by turning the second shift lever 61 circumferentially of the steering column, may be canceled to restore the D-range. In order to detect this pulling operation of the second shift lever 61, there is provided a return switch 65. This return switch 65 is connected with the T/M ECU 10 so that the signal accompanying the return of the second shift lever 61 may be inputted to the T/M ECU 10. Here, the arranged position and the manipulating directions of the second shift lever 61 are shown in an enlarged scale in FIG. 10C.

The shift range can be switched by manipulating the second shift lever 61 when the manual valve 40 is in the D-range position, that is, when the D-range is selected by the shift device for selecting the shift range mechanically. Specifically, the shift range is incremented or decremented when the cut switch 63 or the cut-off switch 62 outputs its signal in the D-range. This increment/decrement of the shift range is executed by switching the prevailing shift range to one lower or higher by one step. Specifically, each time the cut switch 63 outputs its signal, that is, each time the second shift lever 61 is once turned clockwise of FIG. 10A, the shift range is switched sequentially in the order of D-range→"4"-range→"3"-range→"2"-range→L-range. Each time the cut-off switch 62 outputs its signal, that is, each time the second shift lever 61 is once turned counter-clockwise, on the other hand, the shift range is switched sequentially in the order of L-range→"2"- range→"3"-range→"4"-range→D-range.

Each of these shift ranges is set in advance with the gear stages to be set and to effect the engine braking, and these gear stages are stored in advance as the maps in the ECU 10. There are further stored the ON/OFF patterns of the solenoid valves for effecting the engine braking. Moreover, these shift maps and solenoid patterns are changed to set a predetermined one of the shift ranges each time the cut switch 63 or the cut-off switch 62 is turned ON. In the state of the D-range, the output signal of the cut-off switch 62 is canceled even when this switch 62 is turned ON, because of no higher shift range. In the L-range, the output signal of the cut switch 63 is also canceled even when this switch 63 is turned ON, because of no lower shift range.

As the shift range is switched to a lower one, a downshift may be accordingly caused to increase the engine RPM. For protecting the engine 1, therefore, a gear change (or downshift) is inhibited, if this switch 63 is turned ON in the state allowing the overrun or over-revolution of the engine 1, to keep the prevailing shift range.

When the return switch 65 is turned ON, the manual valve 40 is manually moved to set the selected D-range. This setting is executed by changing the shift map for controlling the shift range into one for the D-range and by turning ON/OFF the solenoid valves in accordance with the map.

According to the range control system thus constructed, the shift ranges for the forward runs can be switched by manipulating the second shift lever 61 arranged near the steering wheel 60. As a result, the shift ranges can be switched while the driver is gripping the steering wheel 60 and gazing forward, thereby to improve the shift range switching operation. Moreover, the D-range can be directly set by turning ON the return switch 65 with the second shift lever 61. As compared with the operation in which the cut-off switch 62 turned ON several times to restore the D-range, therefore, the return to the D-range can be facilitated to improve the shift range switching operation better.

Here is considered a vehicle which is equipped with a cruise control system for keeping the running speed constant. This cruse control system is activated, when the second shift lever 61 is manipulated to select the "4"-range, but is inactivated when a lower shift range is selected by manipulating the second shift lever 61. These operations are performed to prevent the vehicle speeds and the gear stages from overlapping.

In the range switching system thus far described according to the present invention, the forward ranges can be shifted from one to another by the electric switching device, and this electric switching can be effected even with the manual valve 40 being set in the D-range. As a result, the switching operation for shifting the forward ranges need not always be accomplished by the second shift lever 61. On the other hand, the mechanical shift device for controlling the manual valve 40 may be constructed to have only the D-range position for the forward runs. These points are considered to exemplify a construction shown in FIG. 11.

Figure 11:
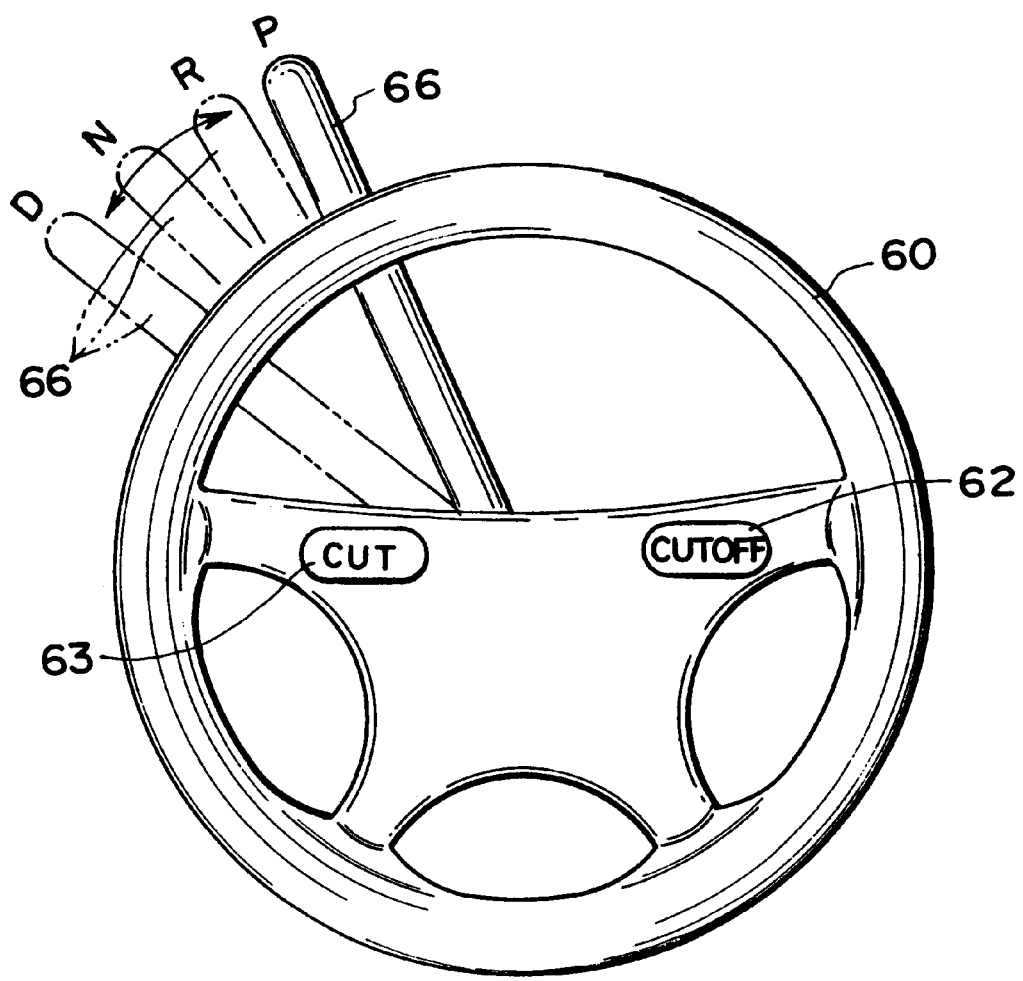
FIG. 11 is a front elevation showing an embodiment, in which a first shift lever or a first range switching mechanism according to the present invention is arranged on a steering column and in which a cut-off switch and a cut switch are fixed to the front side of the steering wheel.

In the construction shown in FIG. 11, a first shift lever 66, as connected to the manual valve 40 by mechanical means such as a cable, is provided to protrude radially of the steering column. This first shift lever 66 is constructed like the lever of the so-called "column type" shift device of the prior art such that it is turned circumferentially of the steering column to switch the manual valve 40. In the example shown in FIG. 11, the first shift lever 66 is provided with the four range positions of the parking (P), reverse (R), neutral (N) and drive (D) positions, which are arranged counter-clockwise sequentially in the recited order, as shown in FIG. 11. Here, it is arbitrary that the (not-shown) shift button has to be depressed between the P-range and the R-range and between the R-range and the N-range.

On the other hand, the cut-off switch 62 and the cut switch 63 for switching the shift ranges electrically in the D-range are arranged near the center of the steering wheel 60. These switches 62 and 63 are constructed of the momentary push button switches. On the other hand, the switches 62 and 63 may be mounted on the steering wheel 60 but may alternatively be mounted on the steering column so that their positions may not be changed by the turn of the steering wheel 60.

The construction, as shown in FIG. 11, not only can achieve effects similar to those obtained by the system having the construction shown in FIG. 10 but also can eliminate the shift device, as arranged sideways of the driver's seat, of the prior art thereby to improve the facility for arranging the remaining devices to be mounted on the vehicle. On the other hand, a first shift lever 66 is positioned ahead of the steering wheel 60. However, since the range positions to be selected by the first shift lever 66 are the above-specified four positions, neither the glance of the driver on the (not-shown) meter panel or the center cluster nor the forward field of view can be shielded by the first shift lever 66 thereby to prevent deterioration in the visibility. This visibility of the center cluster or the like can be improved by making the length of the first shift lever 66 as small as possible.

As has been described above, the first shift lever 66 for switching the manual valve 40 mechanically is operated mainly at the running start, and the switching of the shift range during the run is effected mainly by operating the second shift lever 61, the cut-off switch 62 or the cut switch 63. It is, therefore, sufficient that the shift levers for selecting the P-range or the R-range mechanically can select the necessary minimum shift range, and that they can be arranged at the floor sideways of the driver's seat or on the instrument panel as in the ordinary vehicle of the prior art.

Figure 12:
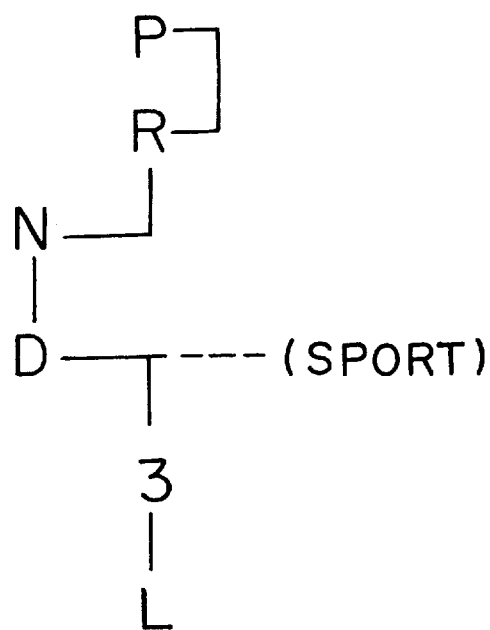
FIG. 12 is a diagram showing an array of the shift positions of the first shift lever which is fixed to a floor or instrument panel for switching the shift range mechanically.

FIG. 12 schematically shows one example of the so-called "gate type shift lever" which is arranged on the floor or the instrument panel. The individual shift positions including the P-range, R-range, N-range, D-range, "3"-range and L-range are arrayed in the recited order from the front side or upper side of the vehicle, as shown in FIG. 12. Here, the solid lines joining the individual shift positions of FIG. 12 indicate the guide grooves for guiding the shift lever being moved. If the shift positions are constructed to enable the so-called "sport mode" to be selected for setting the individual gear stages manually, a shift position for the sport mode may be set in the position, as indicated by "(sport)" in FIG. 12. When the shift range is to be electrically switched, the first shift lever 66 has to be set in the D-range position. For this necessity, an indication of "E" (Electronic) may be made in advance in the D-range position in addition of the indication "D".

Figure 13:
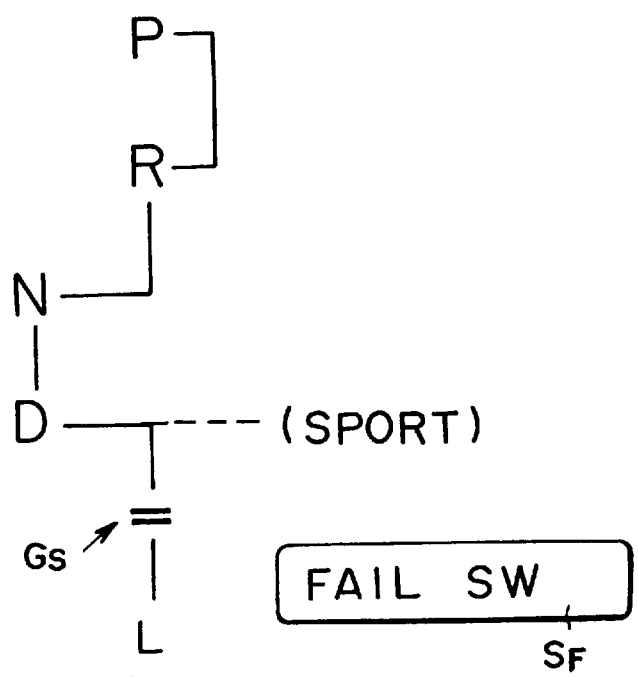
FIG. 13 is a diagram showing another array of the shift positions of the first shift lever which is fixed to the floor or instrument panel for switching the shift range mechanically.

On the other hand, FIG. 13 shows an example which is constructed such that the "3"-range position is eliminated from the construction shown in FIG. 12 and such that a shift to the L-range or the engine braking range is selectively inhibited. Specifically, the forward ranges can be easily selected by the electric switching mechanism including the second shift lever 61 and the cut-off switch 62 or the cut switch 63. It is, therefore, sufficient that the shift device for selecting the shift range mechanically can select the D-range as the forward range and another engine braking range against a failure.

In order to prevent the shift lever from being shifted in the ordinary running state to the engine braking range (i.e., the L-range in the example of FIG. 13), therefore, the construction of FIG. 13 is equipped with a block mechanism GS such as a pin which is fitted in a guide groove so that it may be opened to allow the shift lever to move to the L-range position by operating a fail switch SF arranged in a suitable position. Here, the fail switch SF and the block mechanism GS may be connected either electrically or through mechanical means such as a link.

Moreover, the cut-off switch 62 for outputting the up-range signal and the cut switch 63 for outputting the down-range signal can be attached to the front (facing the driver) and the back (facing the instrument panel) of the steering wheel 60.

As described hereinbefore, a gear change may be caused by switching the shift range so that the drive force may possibly be changed to change the behaviors of the vehicle. In dependence upon the change in the vehicle behaviors, therefore, the switching of the gear or shift range itself has to be inhibited. In the control system of the present invention, therefore, the switching of the shift range is controlled, as follows.

Figure 1:
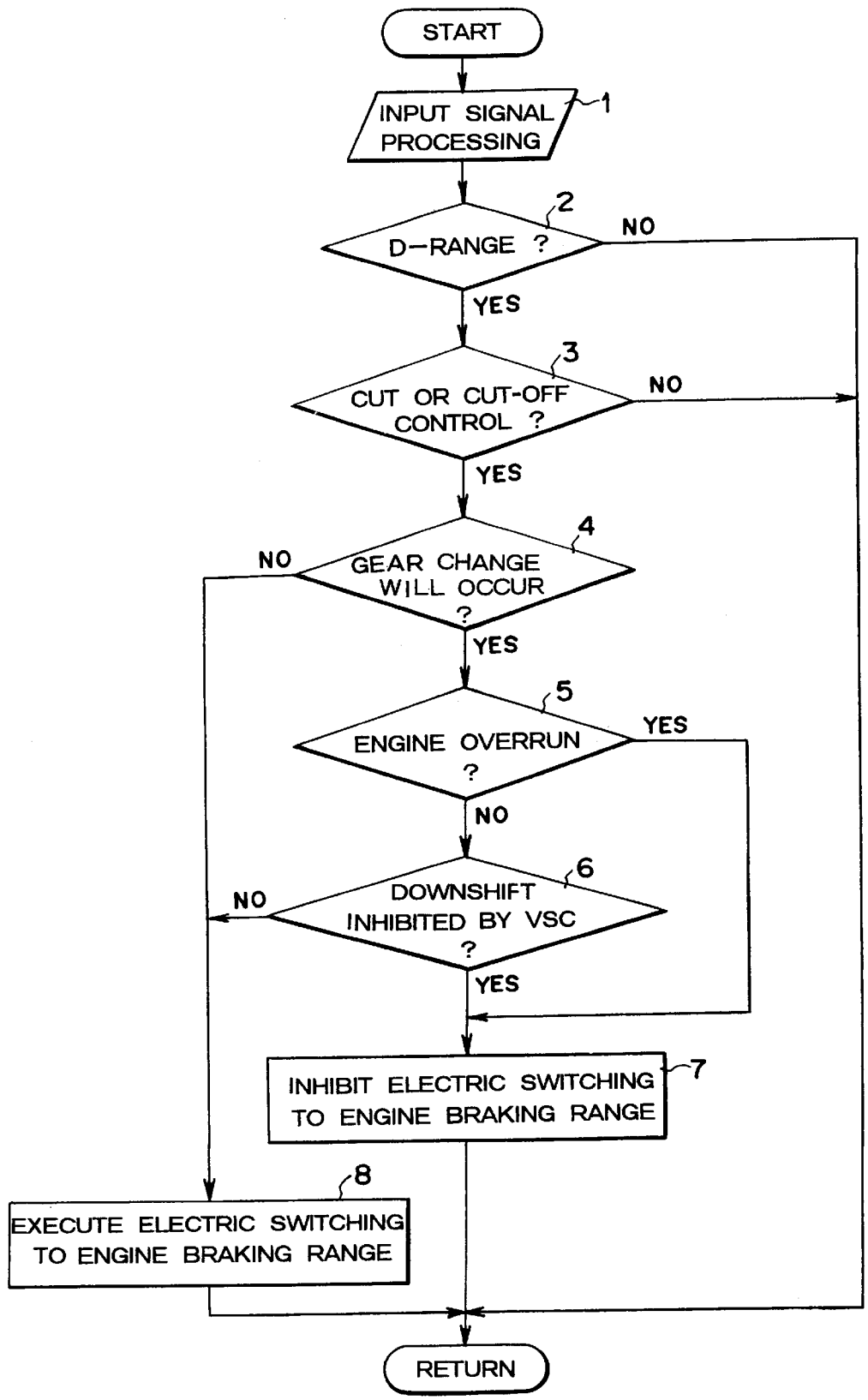
FIG. 1 is a flow chart for explaining a control embodiment of a control system according to the present invention.

FIG. 1 is a flow chart showing one example of the control routine. First of all, input signals are processed (at Step 1) mainly reading the data. Next, by operating the shift lever 66 in the shift device for switching the shift range mechanically, it is decided (a Step 2) whether or not the D-range has been set. The switching of the shift range by the electric operation of the second shift lever 61, the cut-off switch 62 or the cut switch 63 is enabled because the manual valve 40 is set in the D-range position.

Therefore, this routine is left without any control when the answer of Step 2 is NO because the D-range is not set. When the answer of Step 2 is YES because the D-range is set, on the other hand, it is decided (at Step 3) whether or not the cut control or the cut-off control has been made. In other words, it is decided whether or not the cut-off switch 62 or the cut switch 63 has been turned ON. This decision can be made from the fact either the switch 62 or 63 is outputting its signal, and the operation of this Step 3 corresponds to electric range switching instruction detecting means of the present invention.

When the answer of Step 3 is NO, this routine is left without any control. When the answer of Step 3 is YES, it is decided (at Step 4) whether or not a gear change occurs. The operation of this Step 4 corresponds to gear change deciding means for deciding whether or not the gear change will occur as the shift range is switched by operating the cut-off switch 62 or the cut switch 63.

When it is decided at Step 4 that a gear change is caused by the electric switching of the shift range, it is decided (at Step 5) whether or not the engine is to be overrun. In other words, it is decided whether or not the gear change belongs to the downshift so that the engine RPM is caused to exceed a predetermined upper limit by the increase in the gear ratio. Therefore, the decision of Step 5 is executed only when the gear change, as decided at Step 4, belongs to the downshift.

When it is decided that the engine will not be overrun, it is decided (at Step 6) whether or not the downshift is inhibited by a vehicle stabilization control system (VSC). This vehicle stabilization control system (VSC) is a system for stabilizing behavior of the vehicle by sensing the oversteer or understeer tendency at a turning time of the vehicle to control the engine output and the drive force of each wheel individually, and for inhibiting the drive force from being changed by the downshift during the control. At Step 6, therefore, it is decided whether or not this gear change inhibition has been executed.

The operations of Steps 5 and 6 correspond to gear change allowance deciding means. When the answer of Step 5 or Step 6 is YES, the situations do not allow the gear change. In this case, the switching of the shift range, as instructed by turning ON the cut-off switch 62 or the cut switch 63, is inhibited (at Step 7). In short, the inhibition of the electric switching to the engine braking range is executed. The control is then returned, and so the detected shift range switch instruction at Step 3 is canceled unless it is repeated in the next cycle. Therefore, the operation of Step 7 corresponds to range shift inhibiting means.

When the answer of Step 4 is NO because the gear change does not follow the instruction of the switching of the shift range by turning ON the cut-off switch 62 or the cut switch 63, or when the answer of Step 6 is NO because the downshift is not inhibited by the vehicle stabilization control system, the switching of the shift range, as instructed by turning ON the cut-off switch 62 or the cut switch 63, is executed (at Step 8). In short, the control of the electric switching to the engine braking range is executed.

According to the control shown in FIG. 1, therefore, the decision on the inhibition of the switching of the shift range and the decision on the inhibition of the gear change are separated. When the switching of the shift range has no relation to the inhibition of a gear change, even if inhibited, the switching of the shift range is executed. As a result, the switching of the shift range, as electrically instructed, is less inhibited so that the troublesome operation of turning ON the cut-off switch 62 or the cut switch 63 repeatedly can be avoided to improve the operability.

Figure 2A:
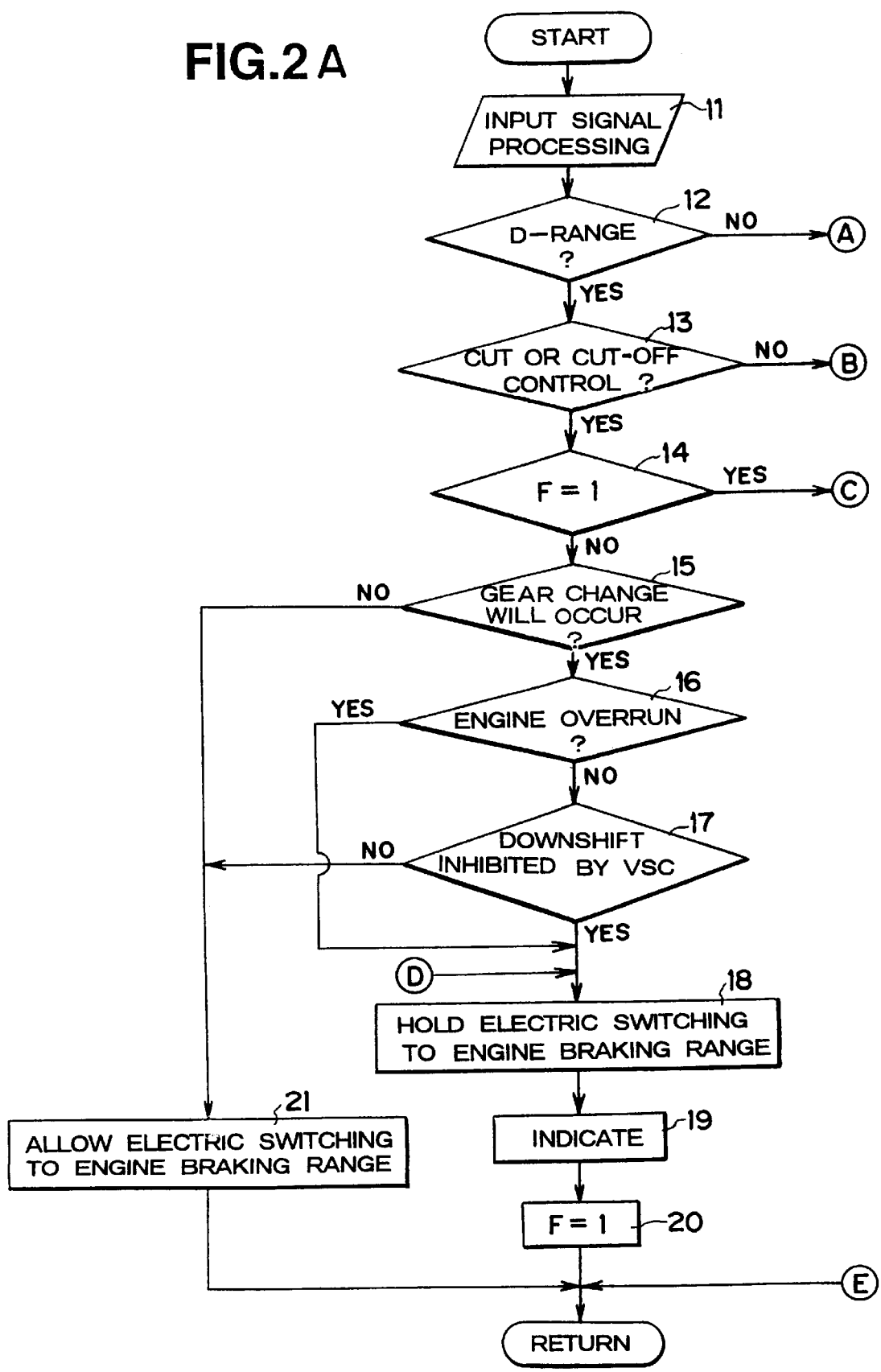
FIG. 2A shows a portion of a flow chart for explaining another control embodiment of the control system according to the present invention.
Figure 2B:
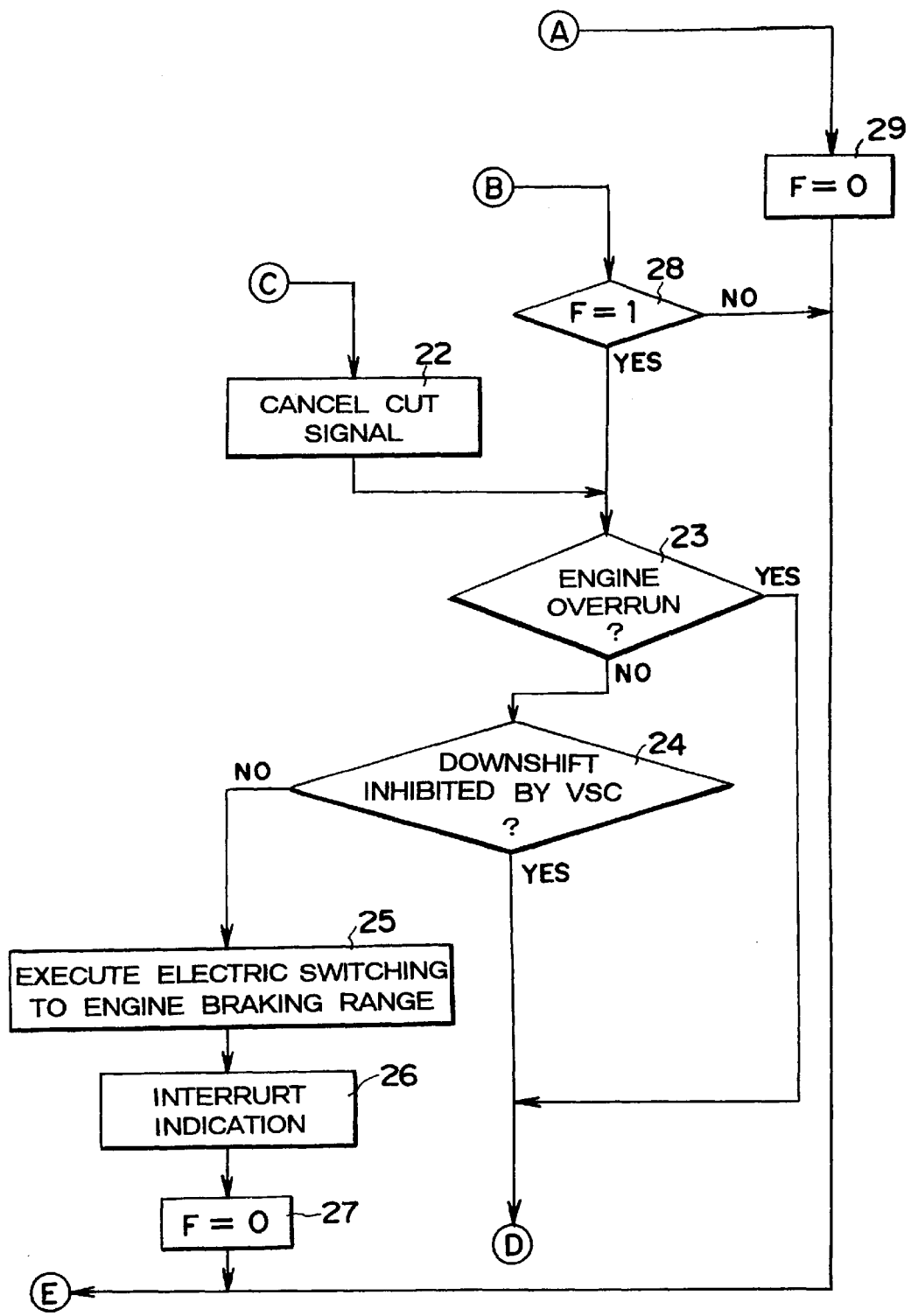
FIG. 2B shows another portion of the flow chart.

FIGS. 2A and 2B show another embodiment of the construction in which the operability is further improved. After the input signal processing (at Step 11), it is decided (at Step 12) whether or not the D-range has been mechanically set. When the answer of Step 12 is YES, it is decided (at Step 13) whether or not the switching of the shift range by the cut-off switch 62 or the cut switch 63 has been controlled. The decision of Step 12 is the same control process as that of Step 2 shown in FIG. 1, and the decision of Step 13 is the same control process as that of Step 3 shown in FIG. 1.

When the answer of Step 13 is YES because the switching of the shift range is electrically instructed, it is decided (at Step 14) whether or not a flag F is at "1". This flag F is set at "1", when the instruction of the electric switching of the shift range is held, but otherwise set at "0". When the answer of Step 14 is NO because the flag F is at "0", it is decided (at Step 15) whether or not a gear change is caused by the electric switching of the shift range. This decision of Step 15 is similar to that of Step 4 shown in FIG. 1. When this answer is YES, it is decided (at Step 16) whether or not the engine will be overrun. This decision of Step 15 is similar to that of Step 4 shown in FIG. 1. This decision of Step 16 is similar to the control process of Step 5 shown in FIG. 1. If the answer of Step 16 is NO, it is decided (at Step 17) whether or not the inhibition of the downshift by the vehicle stabilization control system is being executed. This decision of Step 17 is similar to the control process of Step 6 shown in FIG. 1.

When the answer of Step 16 is YES or when the answer of Step 17 is YES, therefore, the gear change, as might otherwise follow the electric switching of the shift range, is unable to be executed so that the electric switching to the engine braking range is held (at Step 18). In other words, the switching of the shift range, as instructed by operating the cut-off switch 62 or the cut switch 63, is not executed but held. Moreover, this state is indicated (at Step 19), and the flag F is set to "1" (at Step 20).

This indication of the holding state at Step 19 can be implemented by a variety of suitable display means. For example, letters are displayed in the (not-shown) instrument panel, or the prevailing shift range, as set by the mechanical operation or the electric operation, is displayed and flashed in the instrument panel or (not-shown) meter panel. A warning may be additionally made by a voice.

On the other hand, the electric switching to the engine braking range is allowed (at Step 21), when the answer of Step 15 is NO because the gear change is not caused by the electric switching of the shift range or when the answer of Step 17 is NO because the inhibition of the downshift by the vehicle stabilization control system is not made. This control of Step 21 is identical to the control process of Step 8 of FIG. 1. In short, the switching of the shift range, as instructed by turning ON the cut-off switch 62 or the cut switch 63, is executed.

When the electric switching of the shift range is held, as described above, the flag F is set at "1" to affirm the answer of Step 14. In this case, the routine advances to Step 22, at which the cut signal is canceled. Specifically, when the cut switch 63 was turned ON to output the cut signal, this signal is held. As a result, all the succeeding cut signals are canceled because they repeat the same instruction as that of the preceding signals. When the cut-off switch 62 is turned ON in the aforementioned held state, an up-range, as contrary to the down-range, is instructed so that the preceding cut signals are canceled. In this case, the held state is also canceled.

It is then decided (at Step 23) whether or not the engine overrun will be caused by the gear change to be made by the electric switching of the shift range. When the answer of Step 23 is NO, it is decided (at Step 24) whether or not the inhibition of the downshift by the vehicle stabilization control system is executed. This operation of Step 23 is identical to the control process of Step 16, and the operation of Step 24 is identical to the control process of Step 17. When the answer of Step 23 or 24 is YES, therefore, the routine advances to Step 18 like before.

When the answer of Step 24 is NO, on the other hand, the gear change can be executed so that the electric switching to the engine braking range is executed (at Step 25). This is similar to the aforementioned control of Step 21. Since the switching of the shift range is executed to end the held state, the indication is interrupted (at Step 26), and the flag F is reset to "0" (at Step 27).

When the cut-off switch 62 or the cut switch 63 is not turned ON so that the answer of Step 13 is NO, on the other hand, the routine advances to Step 28, at which it is decided whether or not the flag is at "1". In other words, it is decided whether or not the electric switching of the shift range is held. When the answer of Step 28 is YES, the routine instantly advances to Step 23. When the answer of Step 28 is NO, on the other hand, this routine is left without any control.

When the answer of Step 12 is NO because the D-range is not set, this routine is left by resetting the flag F to "0" (at Step 29).

Here will be described the corresponding relations between the individual Steps, as shown in FIGS. 2A and 2B, and the individual means of the present invention. The operation of Step 13 corresponds to electric range switching instruction detecting means of the invention; the operation of Step 15 to gear change deciding means of the invention; the operations of Steps 16, 17, 23 and 24 to gear change allowance deciding means of the invention; the operation of Step 18 to hold means of the invention; and the operations of Steps 21 and 25 to shift range switching executing means of the invention. Moreover, the operation of Step 19 corresponds to hold indicating means of the invention.

With the construction shown in FIGS. 2A and 2B, therefore, the switching of the shift range is instructed by the electric means. Even when the instructed switching of the shift range is not executed because of the unable state of the gear change, the switching instruction of the shift range is not canceled but held. As a result, the electric switching of the shift range is executed when it is enabled by the allowance of the gear change. In short, the repeated instruction of the electric switching of the shift range becomes unnecessary. This reduces the number of repetitions of the instruction of the switching of the shift range thereby to improve the operability. Since the driver can be convinced of the held state by the display means, the repetition of the useless operations can be avoided from this point to improve the operability.

Here will be described another control embodiment of the present invention. In this embodiment, as shown in FIGS. 3A and 3B, the holding of the electric switching of the shift range when the gear change is inhibited is replaced by the cancellation of the instruction of the shift range. Specifically, the instruction of the electric switching to the engine braking range by turning ON the cut switch 63 is canceled (at Step 18A), when the overrun of the engine is decided at Step 16 or 23 or when it is decided at Step 17 or 24 that the downshift is inhibited by the vehicle stabilization control system. Then, it is displayed (or indicated) (at Step 19A) that the canceling control has been executed.

Figure 4:
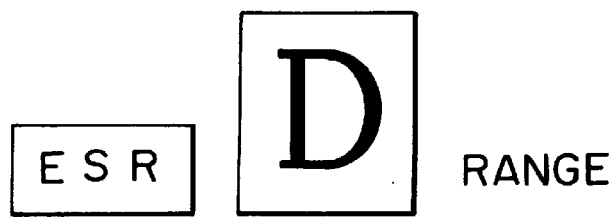
FIG. 4 is a diagram schematically showing one example of the shift range to be executed by the control.
Figure 5:
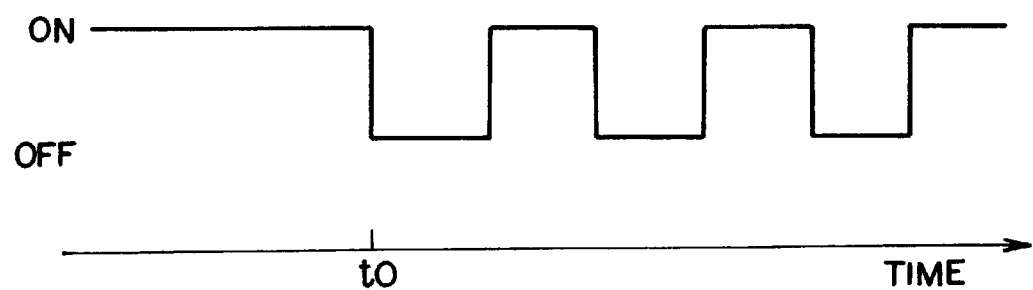
FIG. 5 is a diagram for explaining the flashing of the display of the case in which the switching instruction of the shift range is canceled.

The indication by this Step 19A may be effected by a visual display or an audio notification or by both, and the visual display can be effected by letters in the instrument panel or meter panel of the vehicle. FIG. 4 illustrates one example of the visual display, in which there can be displayed letters "ESR" implying the electric shift range and letter "D" indicating the prevailing shift range now being set. When the electric switching of the shift range is canceled because the gear change is inhibited, the letters display of the shift range is flashed several times, as illustrated in FIG. 5. Here, FIG. 5 illustrates such ON/OFF signals for flashing the letter of the shift range that OFF signals appear several times at a constant time interval from the instant t0 at which the instruction of the switching of the shift range is canceled. These ON/OFF signals may be exemplified by warning sounds.

The remaining Steps of FIGS. 3A and 3B are identical to those of the flow chart shown in FIGS. 2A and 2B, and their description will be omitted. Here will be described the corresponding relations between the operations of the individual Steps of FIGS. 3A and 3B and the individual means of the present invention. The operation of Step 13 corresponds to the electric range switching instruction detecting means of the invention; the operation of Step 15 to the gear change deciding means of the invention; the operations of Steps 16, 17, 23 and 24 to the gear change allowance deciding means of the invention; and the operation of Step 18A to range switching canceling means of the invention.

According to the controls shown in FIGS. 3A and 3B, therefore, the switching of the shift range is performed by the electric operation so that it is canceled when it is disabled by the inhibition of the gear change following the switching of the shift range. As a result, restoration is made to the state in which the switching of the shift range is not instructed, so that, even when the state becomes capable of allowing the gear change, neither the switching of the shift range nor the accompanying gear change will occur. At an instant after lapse of a considerable time period from the switching of the shift range, neither the change in the shift range nor the gear change will occur to prevent the physical disorder due to the feel of delay in the gear change.

Although the present invention has been described on the basis of its specific embodiments, it can be applied to an automatic transmission at which is equipped with a gear train or a hydraulic circuit other than the gear train shown in FIG. 7 or the hydraulic circuit shown in FIG. 9. In the foregoing embodiments, on the other hand, the disability of the gear change is conditioned by the overrun of the engine and the inhibition of the downshift by the vehicle stabilization control system. In the present invention, however, there may be adopted another condition in which the inhibition of the gear change or the inhibition of the switching of the shift range is decided involving another suitable gear change inhibiting condition such as one in a navigation system.

Here will be synthetically described the advantages to be attained from the present invention. According to the present invention, as has been described hereinbefore, when the shift range is to be switched by the electric means, the switching of the shift range is inhibited only if the shift range is accompanied by the gear change and if this gear change cannot be executed on the basis of the state of the vehicle. Therefore, the shift range can be switched according to the electric operation when the switching of the shift range is not accompanied by the gear change. As a result, the frequency of enabling the switching of the shift range by the electric means is raised to improve the operability for switching the shift range by the electric means.

According to the present invention, on the other hand, when the switching of the shift range is temporarily inhibited because the gear change is disabled depending upon the state of the vehicle, the instruction of the switching is held. When the state of allowing the gear change comes in, the held switching of the shift range is executed so that the necessity for repeating the electric instruction of the switching of the shift range is lowered to improve the operability for switching the shift range by the electric means.

Especially according to the present invention, it can be informed by the display means that the instruction of the switching of the shift range is held. This avoids the unnecessary repetition of instructing the switching of the shift range to further improve the operability and convenience.

According to the present invention, moreover, when the electric switching of the shift range is inhibited by the inhibition of the gear change, the shift range switching instruction is canceled at the instant it is inhibited. As a result, even if the gear change is later allowed, neither the switching of the shift range nor the accompanying gear change occurs so that the physical disorder, as might otherwise be invited by the delay in the gear change, can be prevented.

What is claimed is:

1. A control system for an automatic transmission including a range switching mechanism for switching a shift range by electric means, wherein the switching of the shift range causes the transmission to instruct an immediate gear change for some running state conditions and not for other running state conditions, comprising:

electric range switching instruction detecting means for detecting that the switching of the shift range has been instructed by said range switching mechanism;

gear change deciding means for deciding that a gear change will occur according to the instructed switching of the shift range;

gear change inhibition deciding means for deciding that the decided gear change is inhibited; and range switching canceling means for restricting the switching of the shift range until another instruction for switching the shift range is made by the range switching mechanism.

2. A control system according to claim 1, further comprising:

means for displaying a cancellation when the switching instruction of said shift range is canceled by said range switching canceling means.

3. A control system according to claim 1, wherein said gear change deciding means includes means for deciding that a gear change for augmenting a gear ratio will occur.

4. A control system according to claim 1, wherein said gear change inhibition deciding means includes means for deciding whether or not a prime mover, to which is connected said automatic transmission, is overrun according to said gear change.

5. A control system according to claim 1, wherein said gear change inhibition deciding means includes means for deciding that said gear change is inhibited to stabilize the behaviors of a vehicle on which is mounted said automatic transmission.

6. A control system according to claim 1, wherein the range switching canceling means includes means for canceling the instruction of the switching of the shift range, as made by said range switching mechanism, at the instant when the inhibition of said gear change is decided by said gear change inhibition deciding means.

\* \* \* \* \*